Sept. 3, 1968
J. D. BENTLEY
3,399,698
MECHANICAL SEQUENTIAL CONTROL SYSTEM
Filed June 29, 1964
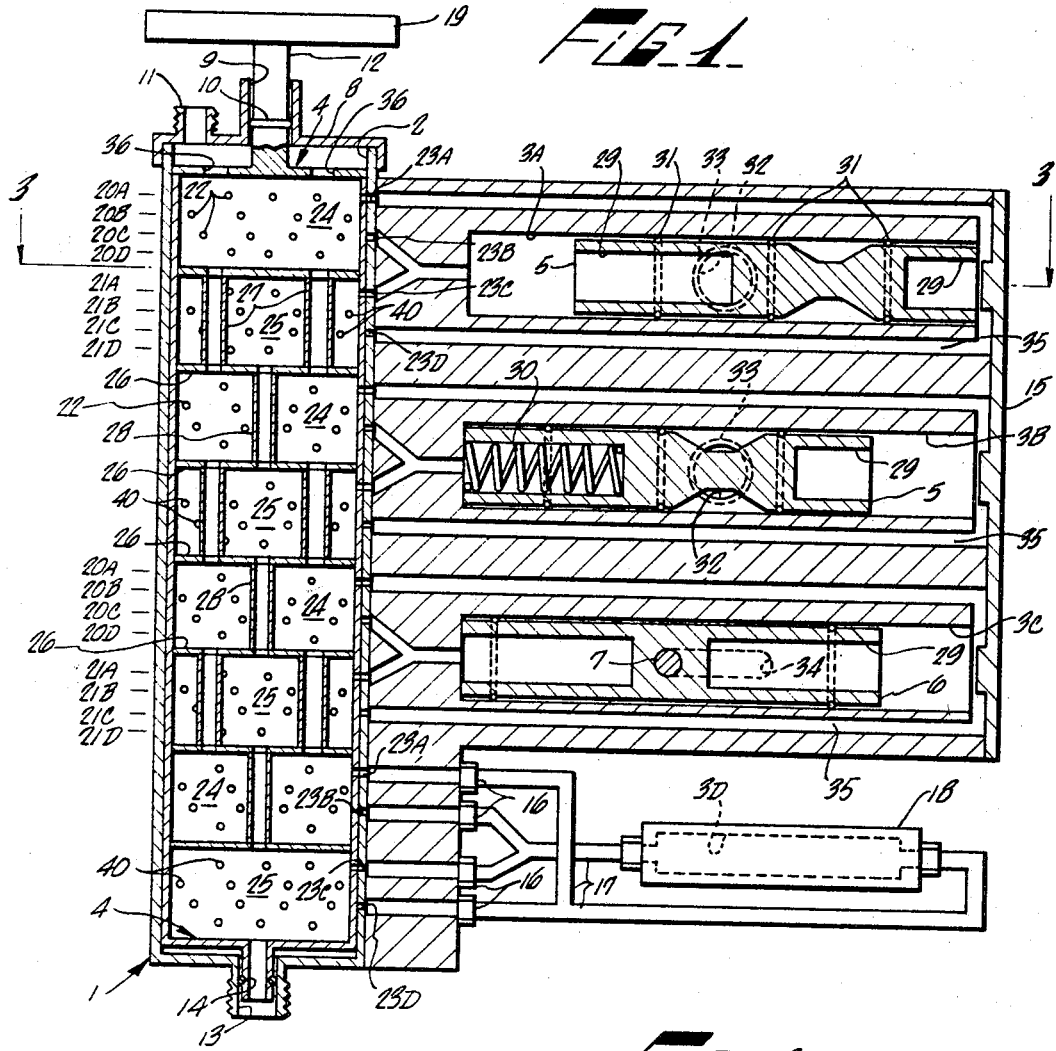
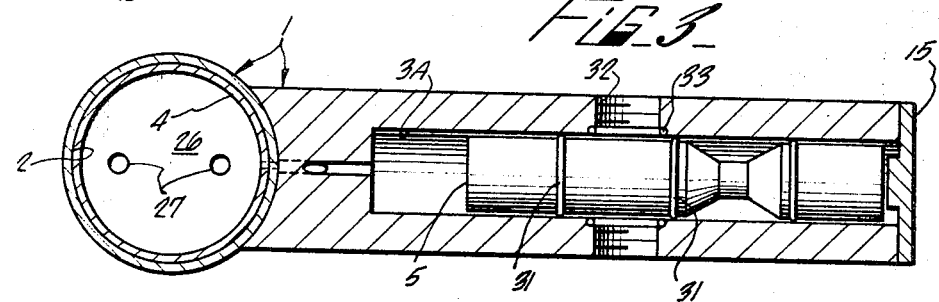
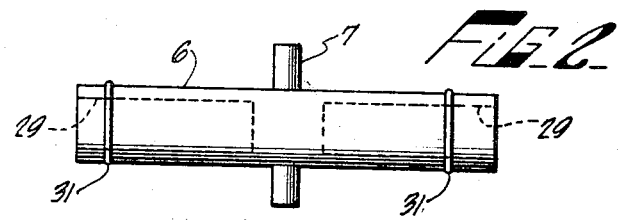
INVENTOR.
JOHN D. BENTLEY 3,399,698
MECHANICAL SEQUENTIAL CONTROL SYSTEM
John D. Bentley, 69 Columbia St.,
Pasadena, Calif. 91105
Filed June 29, 1964, Ser. No. 378,624
3 Claims. (Cl. 137—624.15)

ABSTRACT OF THE DISCLOSURE

A valve device for cyclic operation through one or more pre-selected programs of an apparatus actuable bidirectionally by a pressurized fluid. The device includes a housing having a cylindrical bore, and a hollow cylindrical valve member is fitted snugly in the bore to be rotatable and also to be movable axially between two positions. Fluid fed to the housing is gated to and from the apparatus through radial ports in the valve member and associated ports in the housing as the member is rotated. The operational program established by the device is altered by moving the valve member axially in the bore.

Background of the invention

The design of pre-set sequential control systems for controlling the operation of home appliances such as washers, dryers, and dishwashers and the controls for sequential operation of a great multiplicity of automatic devices of all kinds has reached an impass of progress. Existing control systems for automatic systems rely heavily on electrical technology. It is not unusual for an automatic mechanical device to need a full fledged electronic computer hooked to an extensive complex of wiring harnesses, solenoid actuators, and relay banks to perform a few simple mechanical operations. The cost, complexities, and resulting complications not to mention failures and breakdowns makes these systems extremely hard to use and highly unreliable in their operation when left without maintenance for even a short time. The net result is that automatic control technology needs a step forward in the direction of reduced cost, reduced complexity, reduced maintenance required, in conjunction with increased reliability and increased active life.

The need is for a simple mechanical system that is able to perform simple mechanical operations such as interrupting the flow of hydraulic and pneumatic fluids, and making or breaking electrical and mechanical circuits in a pre-set, repeatable sequence. The operation of the invention disclosed in this application fulfills all these requirements.

This invention relates to a method and device for simultaneously controlling, in any set sequence, the flow of any number of different fluids and controlling the operation of electric and mechanical circuits.

The object of this invention is to utilize the energy in any available hydraulic or pneumatic circuit, and through the action of a sequential timer to direct the hydraulic or pneumatic fluid energizer to the faces of piston type valves which in turn control the operation of several different fluids and control the operation of electric and mechanical circuits. The exact method becomes clear in the accompanying description.

A further object of this invention is to use any suitable means connected in a conventional manner to turn a hollow tubular valve member to index points wherein small holes in the periphery of the hollow tubular valve member will mate up with similar holes in the housing thereupon allowing the hydraulic or pneumatic fluid energizer to flow through the accompanying plumbing to the faces of the piston type valves whereupon retraction or extension of the piston type valves is effected. The retraction or extension of the piston type valves does therewith control the flow of fluids and the operation of electric and mechanical circuits.

Another object of this invention is to show how the mating up of the holes in the periphery of the hollow tubular valve member with the corresponding holes in the housing can effect simultaneously a pressure flow to one side of the piston type valves and an exhaust flow from the other side of the piston type valves thereto bringing about reciprocal movement of the piston type valves.

It is also the object of this invention to show how the resulting reciprocal movement of the piston type valves can effectively interrupt the flow of fluids, can make or break electrical circuits, and can also effect the operation of mechanical circuits.

It is a still further object of this invention to show the four specialized forms of the piston type valves needed to accomplish the control of fluid flow and electrical and mechanical circuits. The four types shown for standard operation of the control system are the standard, spring retracted, lever, and remote types. The specialized functions as well as the operation of the four forms of the piston type valves are explained exactly in the description.

It is a still further object of this invention to show how the hydraulic or pneumatic fluid energizer can be of any chemical composition, so long as it is available at pressure. The preferred type of hydraulic fluid energizer is tap water available in almost all homes and commercial or defense installations. The preferred type of pneumatic fluid energizer is steam available by heating water which is available in almost all homes and commercial or defense installations.

The specialized functions as well as the operation of the four forms of the piston type valves are explained exactly in the description.

These and other objects of this invention will become apparent from the following detailed description in conjunction with the accompanying drawings, in which:

FIGURE 1 is a cross-sectional elevation of the entire control system; FIGURE 2 is an enlargement of the lever type piston valve; and FIGURE 3 is a top view, partly in section, of the control system.

The main component of the control system is the housing 1. The housing's main features are the vertical cylinder bore 2 for the hollow tubular valve member and the several horizontal cylinder bores 3A, 3B and 3C for the piston type valves 5 and 6. The other featured parts of the control system are the hollow tubular valve member 4 and the piston type valves—standard type 5 and the lever type 6 with pin 7. Horizontal cylinder bore 3A is for a standard piston type valve, 3B is for a spring retracted piston type valve, 3C is for a lever piston type valve, and 3D is for a remote piston type valve.

The housing 1 has a removable cover 8 for entry and exit of the hollow tubular valve member 4. The removable cover 8 has an opening 9 for the valve member drive shaft 12 which is sealed by ring seal 10. The removable cover 8 also has on inlet such as a flange fitting 11 for connection to a hydraulic or pneumatic fluid energizer which fills the pressure sections 24 through holes 36 in valve member 4. At the bottom of the bore in housing 1 is an outlet such as a hollow drain boss 13 which also functions as a flange fitting for connection to the drain system. The drain boss 13 is sealed to the valve member 4 by a ring seal 14. A removable cover 15 seals the horizontal cylinder bores 3A, 3B and 3C, provides a stop for piston type valves 5 and 6 and also allows easy access to the bores for precision reaming during construction of the housing. The flange fittings 16 allow the tubes 17 to be connected to the housing 1 for the purpose of supplying remote valves 18 with pressure and exhaust routes.

The hollow tubular valve member 4 is driven by any suitable means connected in a conventional manner shown as number 19 is the drawing. The valve member 4 is rotated by the component 19 to index points on the circumference of the valve member. It is also moved axially or vertically by the component 19 to and between at least two axial positions. This allows the control system to multiply its versatility by bringing into action more than one row of or radial ports 22 which are arranged in axially spaced planes 20A, 20B, 20C and 20D disposed perpendicularly to the axis of rotation of the valve member. The ports 22 in the periphery of the valve member 4 are indexed to mate up exactly with the holes or pressure ports 23A or 23B in the housing 1. When the radial ports 22 mate up with the pressure ports 23, the hydraulic or pneumatic energizing fluid can pass freely from the valve member 4 through the ports 22 and 23 to the horizontal cylinder bores 3A, 3B and 3C where it thereupon moves the piston type valves 5 and 6. The opposite side of the piston type valves 5 and 6 is also in contact with the hydraulic or pneumatic fluid energizer. When the preceding chain of events takes place there is a corresponding simultaneous chain of events that allows the exhaust system to relieve the pressure on the opposite side of the piston type valves 5 and 6 and allow them to move in the direction of the applied pressure. Any hydraulic or pneumatic energizer on the low-pressure side of the pistons flows out of the horizontal cylinder bores 3A, 3B and 3C through exhaust ports 23C or 23D in the housing and radial ports 40 in the valve member, through the exhaust chambers 25 of the valve member 4 and out the drain 13. Ports 40 are arranged in axially spaced planes 21A, 21B, 21C and 21D disposed perpendicularly to the axis of rotation of the valve member, and the planes 21 are spaced apart by the same amount as corresponding planes 20A, 20B, 20C and 20D in pressure chambers 24.

Certain internal walls are needed to separate valve member 4 into pressure chambers 24 and exhaust chambers 25. The internal transverse walls 26 keep the pressure and exhaust chambers apart. Tubes extending between alternate pairs of walls 26 form passageways 27 to allow free flow of the hydraulic or pneumatic fluid energizer between the pressure chambers 24. Tubes extending between the remaining alternate pairs of walls 26 form passageways 28 to allow free flow of the hydraulic or pneumatic fluid energizer through the chambers 25 to the drain 13.

The piston type valves 5 and 6 have hollowed out portions 29 at both ends. These hollows 29 serve four purposes. They serve as a receptacle for the energizing fluid upon activation of the piston type valves in order to slow the operation of the valves for the purpose of softening the action of the control system. Therefore the control system is incapable of abrupt or harsh action unless the hollows 29 are omitted during construction of the piston type valves. The hollows 29 serve as a holder for a spring 30 if a spring retracted piston type valve was required for a particular application. The hollows 29 also make for a great saving of material in the construction of piston type valves. The final purpose of the hollows 29 is their use for positioning of the piston type valve during precision machining of the valve. Ring seals 31 prevent leakage past the piston type valves. Fluid flow connectors 32 with ring seals 33 allow connection of the piston type valves to fluid lines for the purpose of controlling the flow through same. Opening 34 in the housing 1 allows protrusion of the pin 7 which is connected to electric switches or to mechanical circuits for the purpose of effecting control over same. When the piston type valve is in the position shown in the horizontal cylinder bore 3A, it is apparent from the drawing that flow through the connectors 32 is arrested. When the piston type valves are in the position shown in the horizontal cylinder bore 3B, it is apparent from the drawing that flow through the connectors 32 can now take place and will continue until the piston type valve is returned to the position shown in the horizontal cylinder bore 3A. It is apparent from careful examination of the drawing that the remote valve housing 18 can be adapted to any one of the three piston type valve forms; either the standard, spring retracted, or lever types.

Several combinations of radial ports are shown on the periphery of valve member 4. It is to be understood that the multiplicity of combinations of holes on the valve member and the variety to the sequence of operations of the invention is not to be limited thereby and is in fact nearly infinite.

Another unique feature of this invention neglected so far is the design of the passageways 35. The passageways 35 are directed into the horizontal cylinder bores 3A, 3B and 3C near the gravity bottom of the horizontal cylinder bores. The purpose of such a feature is to allow most of the hydraulic fluid energizer to be drawn out of the horizontal cylinder bore by the force of gravity each time the exhaust system is engaged through the mating up of radial ports 40 in the exhaust chamber 25 of the valve member and exhaust port 23D in the housing. Then when the pressure chamber 24 of the valve member is connected through radial ports 22 and pressure port 23A to this fully scavenged portion of the horizontal cylinder bore 3, there will be a noticeable lag in the activation of the piston type valves 5 or 6 while the hydraulic or pneumatic fluid energizer fills the horizontal cylinder bore 3 and the hollow 29 before movement of the piston type valves 5 or 6 can take place. Therefore the action of the control system is considerably slowed down and softened giving a smooth action to the moving of the valve. If it is planned to use a pneumatic fluid energizer the position of the passages 35 near the gravity bottom of the horizontal cylinder bores 3 will neither help nor hinder the operation of the piston type valves nor the control system as a whole.

Other passageways or similar conduit means in the housing serve to place the opposite ends of the cylinder bores in communication with the pressure and exhaust ports in the housing.

The sequential and programmable operation of the valve device in my control system will be explained in the following examples of the several modes of operation. Referring to FIG. 1, it is apparent that radial ports 22 in the uppermost row in the uppermost pressure chamber 24 of the valve member are circumferentially spaced around the periphery of the valve member and are aligned in plane 20A which is normal to the axis of rotation of the valve member. Similarly, there are three further rows or sets of radial ports 22 in uppermost pressure chamber 24 and circumferentially arranged around the periphery of the valve member. These sets of radial ports lie in planes 20B, 20C and 20D respectively, and these planes are also normal to the axis of rotation of the valve member.

Uppermost exhaust chamber 25 has four corresponding rows or sets of radial ports 40 arranged in axially spaced planes 21A, 21B, 21C and 21D, the planes being normal to the axis of rotation of the valve member. The circumferential spacing of the radial ports in the exhaust chamber corresponds to the circumferential spacing of the associated radial ports in the pressure chamber. For example, the circumferential spacing of radial ports 22 in plane 20A in pressure chamber 24 corresponds exactly to the circumferential spacing of radial ports 40 in plane 21A in exhaust chamber 25. Similarly, the ports in planes 20B and 21B have matching circumferential spacing. The choice of radial-port position is of course determined by the cyclic program through which piston type valve 5 is to be actuated.

When valve member 4 is rotated while positioned axially in housing bore 2 as shown in FIG. 1, radial ports 22 in planes 20A and 20C of the pressure chamber rotate serially into alignment with pressure ports 23A and 23B respectively, allowing the fluid energizer to flow through the passages in the housing to react against alternate ends of the piston. Simultaneously, corresponding radial ports 40 in planes 21A and 21C of exhaust chamber 25 rotate serially into alignment with exhaust ports 23C and 23D in the housing, permitting any fluid energizer in the low-pressure side of the piston type valve to flow into the exhaust chamber and through passageways 28 and the other exhaust chambers to drain 13. As long as the valve member is maintained in this axial position, continuous rotation of the member will thus cause cyclic, reciprocating operation of the piston type valve in accordance with the program established by the circumferential spacing of the radial ports.

If the valve member is raised vertically to place radial ports 22 in planes 20B and 20D in alignment with pressure ports 23A and 23B respectively, the piston type valve can be cyclically actuated in a second program according to the spacing of the radial ports in planes 20B and 20D. This change in axial position of the valve member also positions radial ports 40 in planes 21B and 21D of exhaust chamber 25 in alignment with exhaust ports 23C and 23D respectively whereby fluid energizer on the low-pressure side of the piston is drained through the several exhaust chambers and passages 28 to drain 13.

As made clear in the drawings, the other pressure and exhaust chambers in the valve member are variably positioned exactly as described above to actuate the other piston type valves, permitting programmed operation of the valves upon rotation of the valve member, and further providing a program change and bidirectional operation by shifting the valve member axially in the housing to bring different sets of radial ports into alignment with the pressure and exhaust ports through the housing.

I claim as my invention:

1. In combination with an apparatus actuable bidirectionally by a pressurized fluid, the apparatus having first and second passages to receive the fluid and being actuable in first and second directions by introducing the fluid to the first and second passages respectively, a valve device for multi-program operation of the apparatus comprising:

a housing having a cylindrical bore and having axially spaced first and second pressure ports in the bore, the housing including means for communicating the first pressure port to the first passage and means for communicating the second pressure port to the second passage, the housing further including an inlet and an outlet to receive and exhaust the pressurized fluid and having axially spaced first and second exhaust ports in the bore, the exhaust ports being axially spaced apart from the pressure ports, the housing further having means for communicating the first exhaust port with the second passage of the apparatus and means for communicating the second exhaust port with the first passage of the apparatus; and a hollow cylindrical valve member sealingly mounted in the housing bore for rotation therein and being movable parallel to the axis of rotation of the member to first and second positions, the member having first through eighth radial ports therethrough positioned in first through eighth planes respectively, the planes being axially spaced and normal to the axis of rotation of the member, the member further having an internal transverse wall extending thereacross to form sealed-apart pressure and exhaust chambers, the first-through-fourth radial ports and fifth-through-eighth radial ports being on opposite sides of the transverse wall and opening into the pressure and exhaust chambers respectively, the pressure chamber having an inlet in communication with the housing inlet and having an outlet in communication with the housing outlet;

the first and third planes intersecting the first and second pressure ports respectively and the fifth and seventh planes intersecting the first and second exhaust ports respectively when the member is in the first position, and the second and fourth planes intersecting the first and second pressure ports respectively and the sixth and eighth planes intersecting the first and second exhaust ports respectively when the member is in the second position, the planes and pressure ports being axially spaced whereby only two planes intersect said pressure ports when the member is in either of said positions, the radial ports being circumferentially spaced whereby only one radial port at a time is aligned with said pressure ports as the member is rotated, the circumferential spacing of the fifth through eighth radial ports corresponding to the circumferential spacing of the first through fourth radial ports respectively.

2. The valve device defined in claim 1 in which the valve member includes a plurality of circumferentially spaced-apart and axially aligned radial ports in at least two of said planes.

3. The valve device defined in claim 1 in which the valve device is adapted for actuation of more than one apparatus, the housing having additional sets of pressure and exhaust ports axially spaced from said pressure and exhaust ports, the member further comprising a plurality of internal transverse walls extending thereacross to define alternating sealed-apart pressure and exhaust chambers having respective radial ports alignable with the pressure and exhaust ports, means forming a passage between the pressure chambers and means forming a passage between the exhaust chambers.

References Cited

UNITED STATES PATENTS

| 2,144,790 | 1/1939 | Beiderman | 91—39 X |
| 2,827,767 | 3/1958 | Hill | 137—624.18 X |
| 2,864,342 | 12/1958 | Ziegelmeyer | 92—138 X |
| 2,960,073 | 11/1960 | Roxburgh | 137—625.23 X |
| 3,015,344 | 1/1962 | Hausmann | 137—635 X |
| 3,022,738 | 2/1962 | Krute | 137—625.23 X |
| 3,037,484 | 6/1962 | Dixon | 92—138 X |
| 3,098,505 | 7/1963 | Zappia | 91—36 X |
| 3,177,898 | 4/1965 | Scott | 137—624.11 |

FOREIGN PATENTS

| 550,253 | 12/1922 | France. |

ALAN COHAN, *Primary Examiner.*